United States Patent [19]

Burch et al.

[11] Patent Number: 5,367,929
[45] Date of Patent: Nov. 29, 1994

[54] FLUID JET CUTTING KNIFE APPARATUS

[75] Inventors: Ronald H. Burch, Harahan; Mark E. Sutton, Kenner; Frank B. Henry; Warren E. Cancienne, both of River Ridge, all of La.

[73] Assignee: The Laitram Corporation, Harahan, La.

[21] Appl. No.: 90,790

[22] Filed: Jul. 13, 1993

[51] Int. Cl.⁵ .................................................. B26F 3/00
[52] U.S. Cl. ........................................... 83/177; 83/53; 83/423; 83/471.3; 83/932
[58] Field of Search ............. 83/177, 53, 471.3, 486.1, 83/932, 423

[56] References Cited

U.S. PATENT DOCUMENTS

| | | | |
|---|---|---|---|
| Re. 33,917 | 5/1992 | Lapeyre et al. | 452/158 |
| 2,719,547 | 10/1955 | Gjerde | 83/471.3 |
| 3,089,775 | 1/1960 | Lindall | 99/107 |
| 3,302,669 | 2/1967 | Edler | 83/471.3 |
| 3,593,370 | 7/1971 | Lapeyre | 17/52 |
| 3,594,191 | 7/1971 | Lapeyre | 99/111 |
| 3,675,273 | 7/1972 | Vidjak | 17/61 |
| 3,800,363 | 4/1974 | Lapeyre | 17/52 |
| 3,978,748 | 9/1976 | Leslie et al. | 83/53 |
| 4,020,528 | 5/1977 | Lindbladh et al. | 17/50 |
| 4,217,679 | 8/1980 | Gordon | 17/46 |
| 4,246,838 | 1/1981 | Pulver et al. | 83/177 X |
| 4,435,902 | 3/1984 | Mercer et al. | 83/177 X |
| 4,520,702 | 6/1985 | Davis et al. | 83/71 |
| 4,557,019 | 12/1985 | Van Devanter et al. | 17/52 |
| 4,651,476 | 3/1987 | Marx et al. | 51/410 |
| 4,669,229 | 6/1987 | Ehlbeck | 51/410 |
| 4,726,094 | 2/1988 | Braeger | 17/54 |
| 4,738,004 | 4/1988 | Lapeyre | 17/52 |
| 4,748,724 | 6/1988 | Lapeyre et al. | 17/54 |
| 4,847,954 | 7/1989 | Lapeyre | 17/54 |
| 4,868,951 | 9/1989 | Akesson et al. | 17/54 |
| 4,875,254 | 10/1989 | Rudy et al. | 17/61 |
| 4,962,568 | 10/1990 | Rudy et al. | 17/52 |
| 5,061,221 | 10/1991 | Holzhüter et al. | 452/184 |
| 5,133,687 | 7/1992 | Malloy | 83/177 X |

FOREIGN PATENT DOCUMENTS 2303800 12/1990 Japan ....................... 177/
889787 2/1962 United Kingdom .

*Primary Examiner*—Eugenia Jones
*Assistant Examiner*—Kenneth E. Peterson
*Attorney, Agent, or Firm*—Pravel, Hewitt, Kimball & Krieger

[57] ABSTRACT

A fluid cutting system of improved configuration provides a high-velocity fluid that is rotated about a first axis (preferably a horizontal axis) on a moving trolley. The trolley is rotationally supported about a second axis (preferably vertical). The trolley travels upon a pair of arc-shaped tracks and is driven by a motor drive. The trolley has a pair of arc-shaped tracks that support the fluid jet nozzle. The fluid nozzle is thus rotatable about two axes, thereby emitting a high-pressure stream of fluid for adjustable cutting. A workpiece positioning frame has a fish section holder that can be elevated or moved laterally with respect to the cutting system.

23 Claims, 11 Drawing Sheets

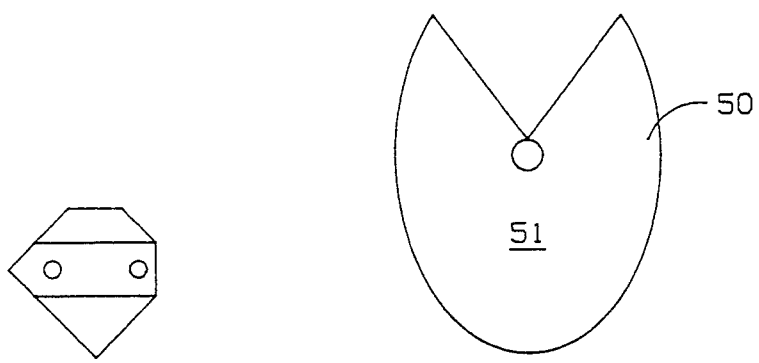
FIG. 4A
FIG. 4
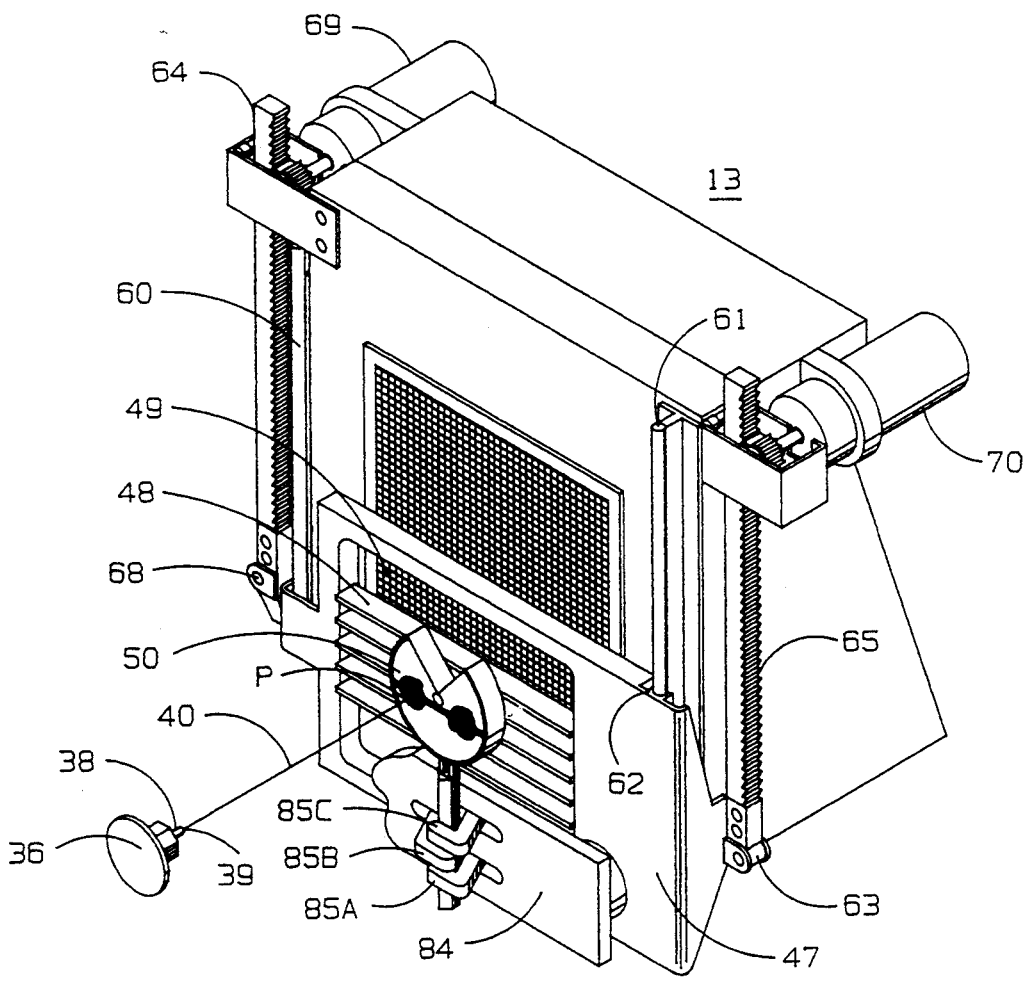
FIG. 5

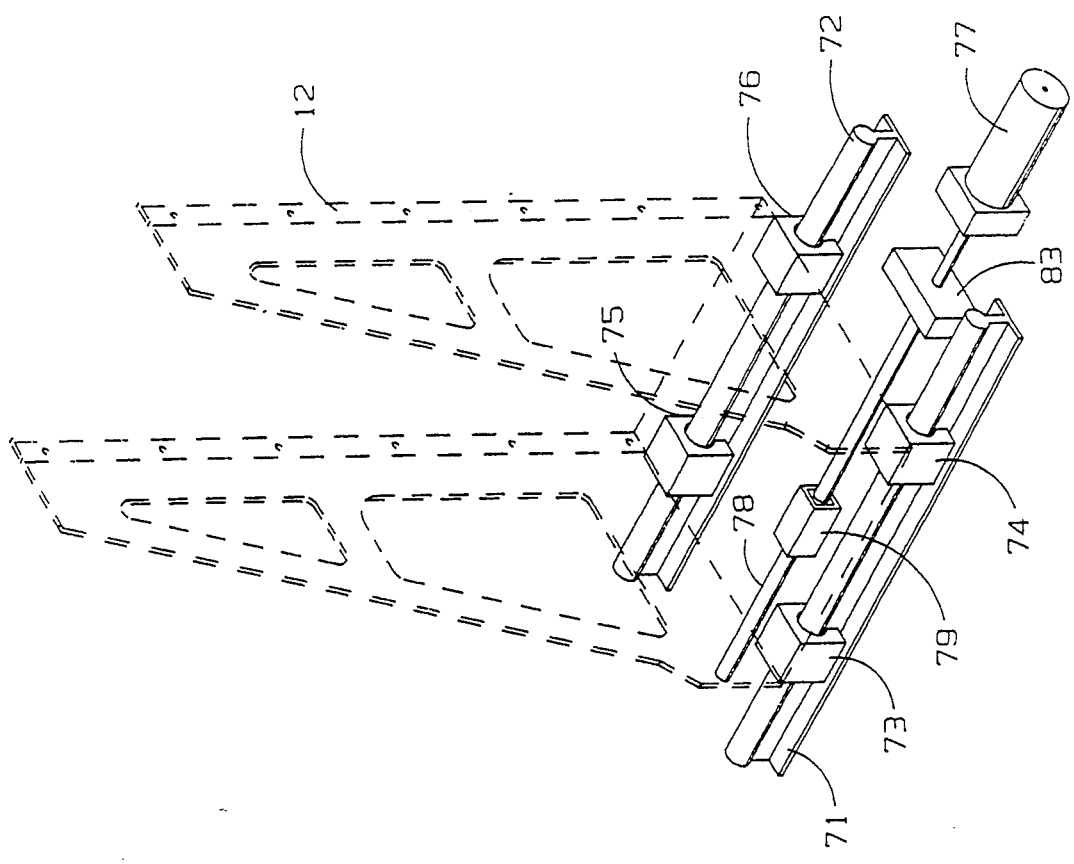
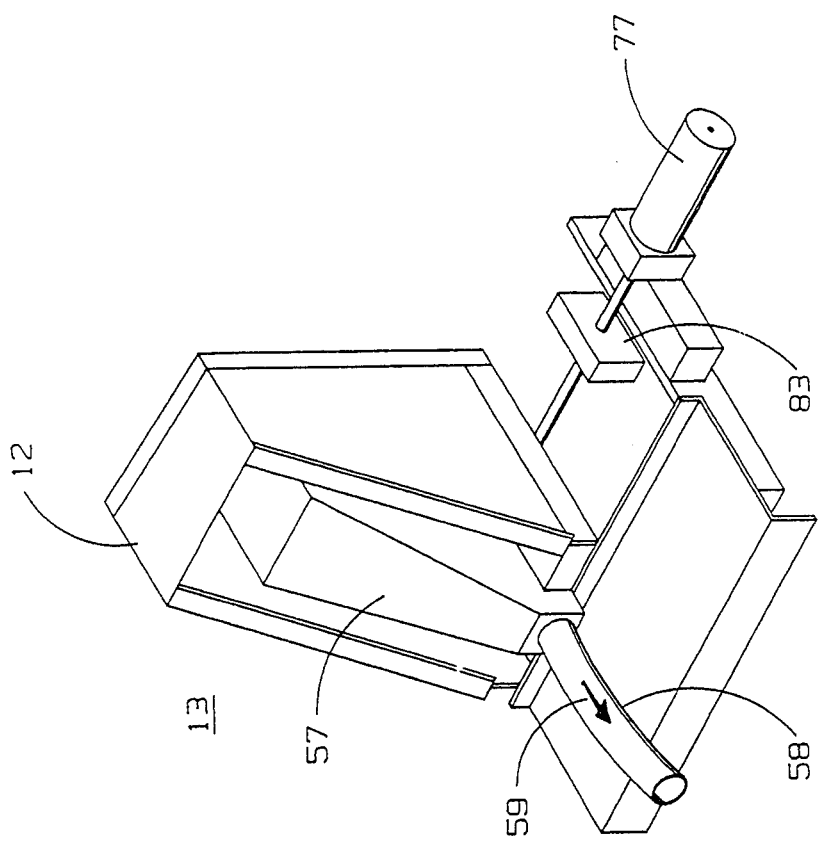

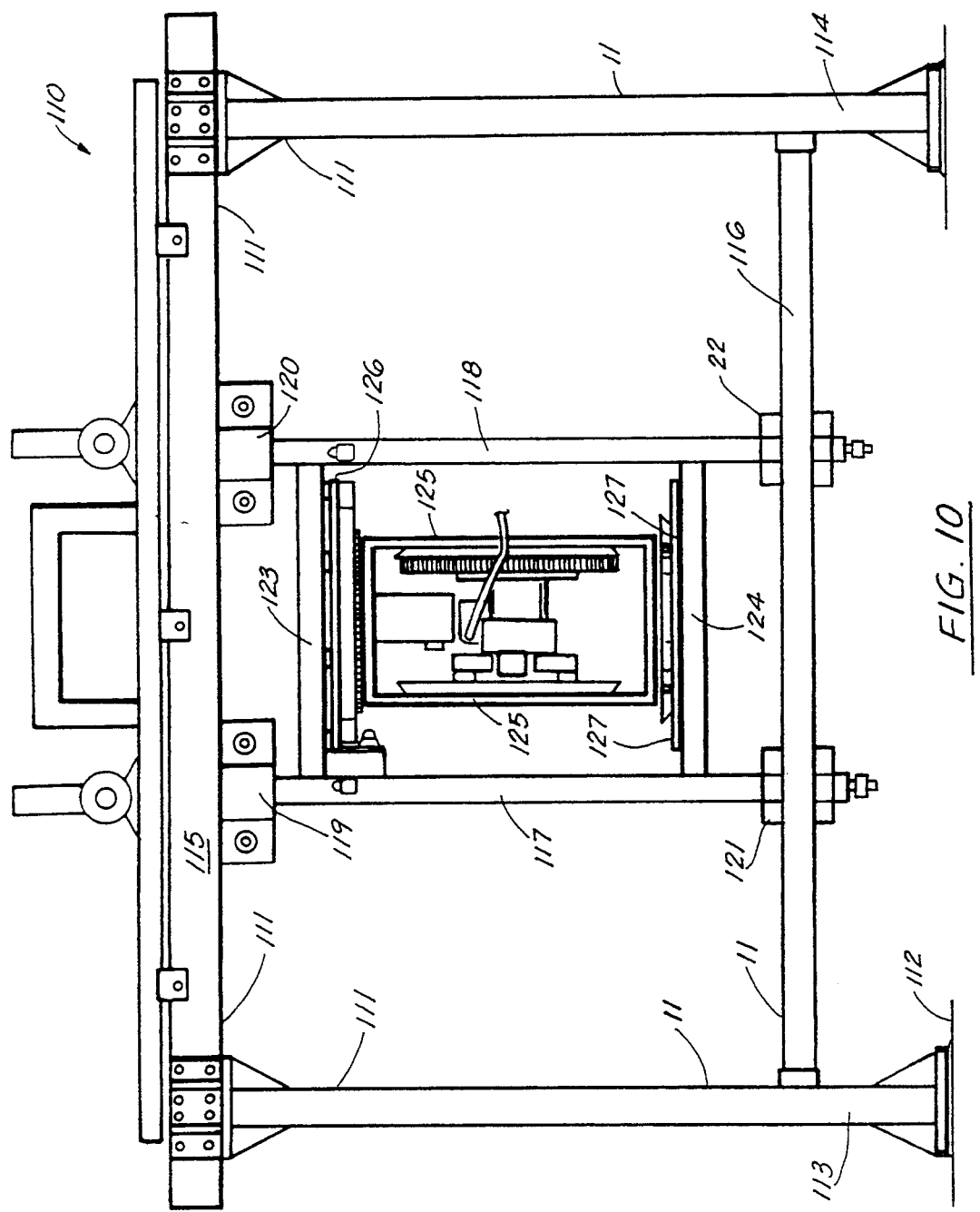

FLUID JET CUTTING KNIFE APPARATUS

BACKGROUND OF THE INVENTION

1. Field of the Invention

The present invention relates to an improved fluid jetting knife robot apparatus having a fluid jet knife pivotally movable upon a trolley that is rotatable upon a fluid jet support frame. The fluid jet targets a movable frame holding a workpiece so that the fish processing uses the cutting action of the jet knife in combination with lateral and elevational movement of the workpiece in a plane that faces the water jet knife.

2. General Background

In the processing of food items, (such as fish or meat), undesirable bone, viscera, bloodmeat and the like must often be separated from edible parts. In the processing of fish such as tuna, it is common to freeze a catch of fish at sea, and to process the catch on shore. The processing normally involves thawing the fish followed by manual operations of slicing the fish belly and the removal of viscera. The visceral cavity is then washed with water, and the tuna inspected for spoilage. The tuna is then usually cooked whole in a batch type precooking operation.

Manual prior art methods of processing tuna are described in greater detail in U.S. Pat. No. 3,594,191 issued to J. M. Lapeyre. The '191 Lapeyre patent discloses the concept of cutting the tuna in lateral sections at spaced intervals and thereafter separating the edible loin portions to provide discrete cannable portions.

A later U.S. Pat. No. 3,593,370 entitled "Method of Butchering Tuna" issued to J. M. Lapeyre, describes a method for processing such transverse tuna sections while frozen. The method of butchering frozen tuna described in the '370 Lapeyre patent includes the subdivision of the whole fish into a plurality of transverse cross-sections and subsequently subdividing the cross-sections into frozen segments. The junctures between the segments are along lines generally parallel to the longitudinal axis of the fish and to the backbone thereof. Each lateral fish section is skinned and the skinned sections operated on to effect a separation of the scrap parts of the segments from the loin meat parts, while the latter were still in at least a partially frozen condition.

U.S. Pat. No. 3,800,363 issued to J. M. Lapeyre entitled "Tuna Butchering Method and System" describes an automated butchering method and system for separating the edible loin portions of transverse tuna slices provided by subdivision of a frozen whole tuna.

Three additional, more recently issued U.S. Patents that are owned by The Laitram Corporation, assignee of the present application, and relate to transverse fish section processing and water jet cutters include U.S. Pat. No. 4,748,724, entitled "Support Apparatus For Use In Video Imaging And Processing Of Transverse Fish Sections;" U.S. Pat. No. Re. 33,917, entitled "Support Apparatus For Use In Video Imaging And Processing Of Transverse Fish Sections;" and U.S. Pat. No. 5,181,879 entitled "Method and Apparatus for Processing Fish Into Transverse Sections."

A problem encountered in the cutting of fish sections with a water jet knife is precision, which is required to separate fish skin, blood meat, bone, visceral and like portions from the edible portions. Therefore, there is a need for an improved, precise cutting system that can precisely process the fish section with minimum waste.

Prior art type robot cutters typically move the cutting knife portion only. This requires very large structural members and very large drive motors to control the cutting knife for its robotic movement into a large number of cutting positions.

SUMMARY OF THE INVENTION

The present invention provides an improved fluid jet cutting apparatus that includes a wrist assembly including a first support for supporting and moving a fluid jetting knife, and a second support, or gantry, for supporting and moving a workpiece. The cutting knife and workpiece both move during the cutting operation. The apparatus includes a first support frame with a fluid jetting trolley that is movably supported with respect to the frame and has a fluid jet knife with a nozzle portion that can transmit a high velocity jet, or stream, of fluid for cutting. The fluid jetting trolley can be rotated about a selected axis (preferably vertical). The nozzle portion rotates about another selected axis (preferably horizontal). During operation, the nozzle thus pivots about only two orthogonal axes, such as the "X" and "Y" axes. A pivot point about which the cutting knife pivots during use is defined at the intersection of the high velocity stream and the surface of the workpiece being cut. The pivot point remains at the same elevational and lateral position in space.

The workpiece gantry supports a moving target positioning portion that can be selectively elevated and lowered, or moved laterally with respect to the fluid jet knife support. In this manner, both the fluid jet knife and workpiece simultaneously move during the cutting operation.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 4 is a schematic elevational view of the preferred embodiment of the apparatus of the present invention illustrating a transversely cut fish section supported by the holder portion thereof;

FIG. 4A is a cross-sectional view of the holder portion of FIG. 4;

FIG. 5 is a partial perspective view of the preferred embodiment of the apparatus of the present invention illustrating the fluid jet knife and target positioner portions thereof;

FIG. 6 is a rear perspective view of the preferred embodiment of the apparatus of the present invention illustrating the target positioner;

FIG. 9 is a partial perspective view of the preferred embodiment of the apparatus of the present invention showing the target positioner frame in phantom and its horizontal slide rail portions;

FIG. 10 is a rear view of an alternate embodiment of the apparatus of the present invention;

DETAILED DESCRIPTION OF THE PREFERRED EMBODIMENT

Figure 1:
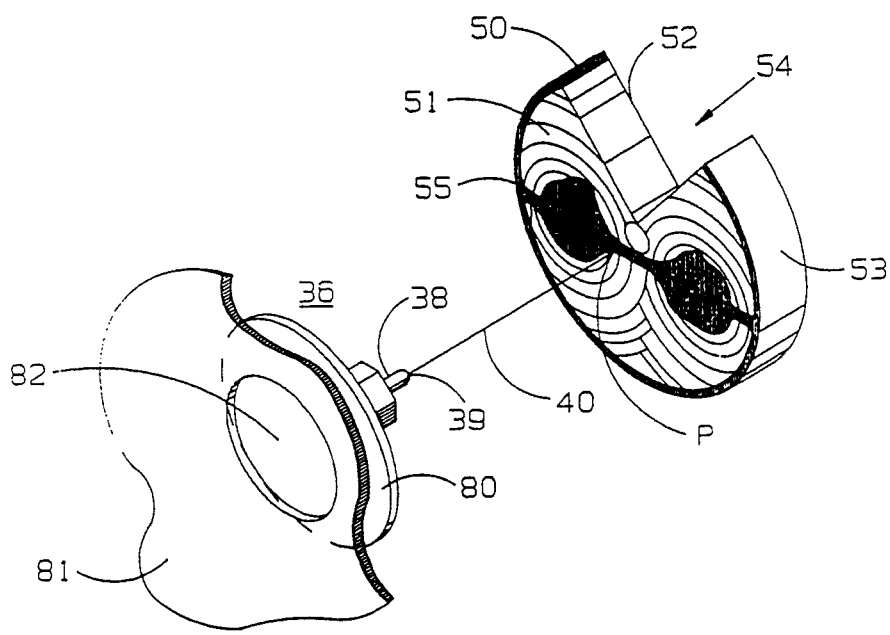
FIG. 1 is a fragmentary perspective view of the preferred embodiment of the apparatus of the present invention.
Figure 2:
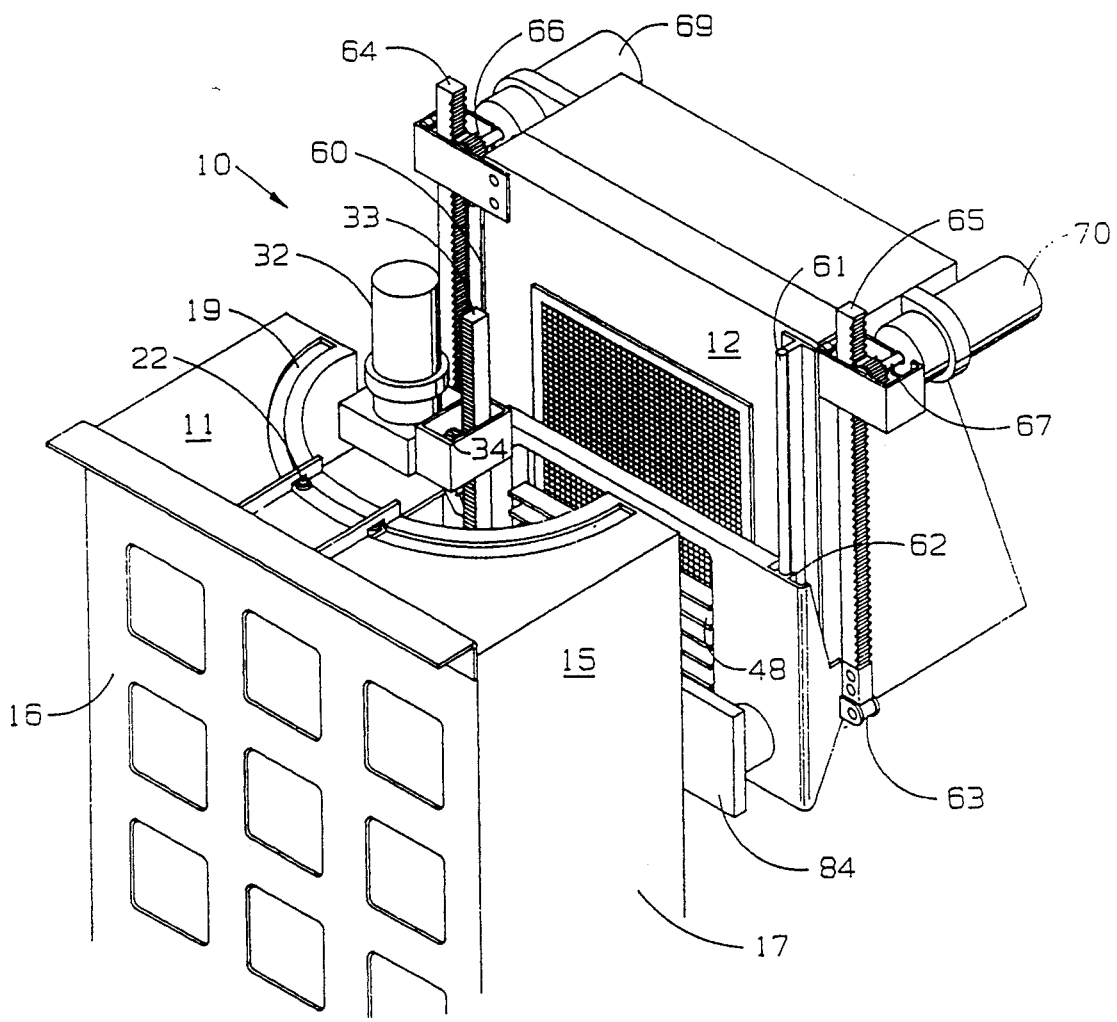
FIG. 2 is a perspective view of the preferred embodiment of the apparatus of the present invention.
Figure 3:
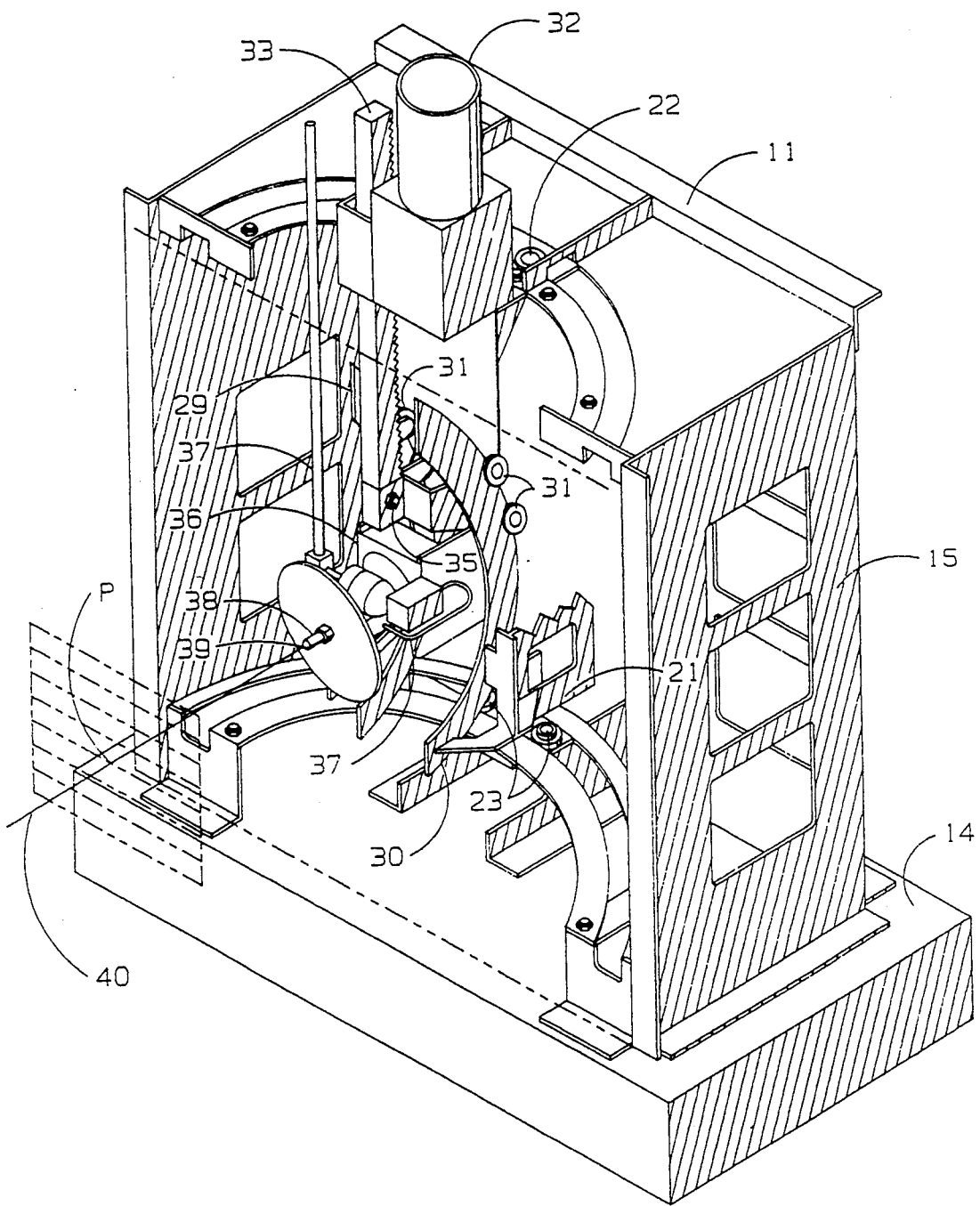
FIG. 3 is a partial perspective view of the preferred embodiment of the apparatus of the present invention illustrating the fluid jet knife wrist with the cutting plane shown in phantom lines.
Figure 7:
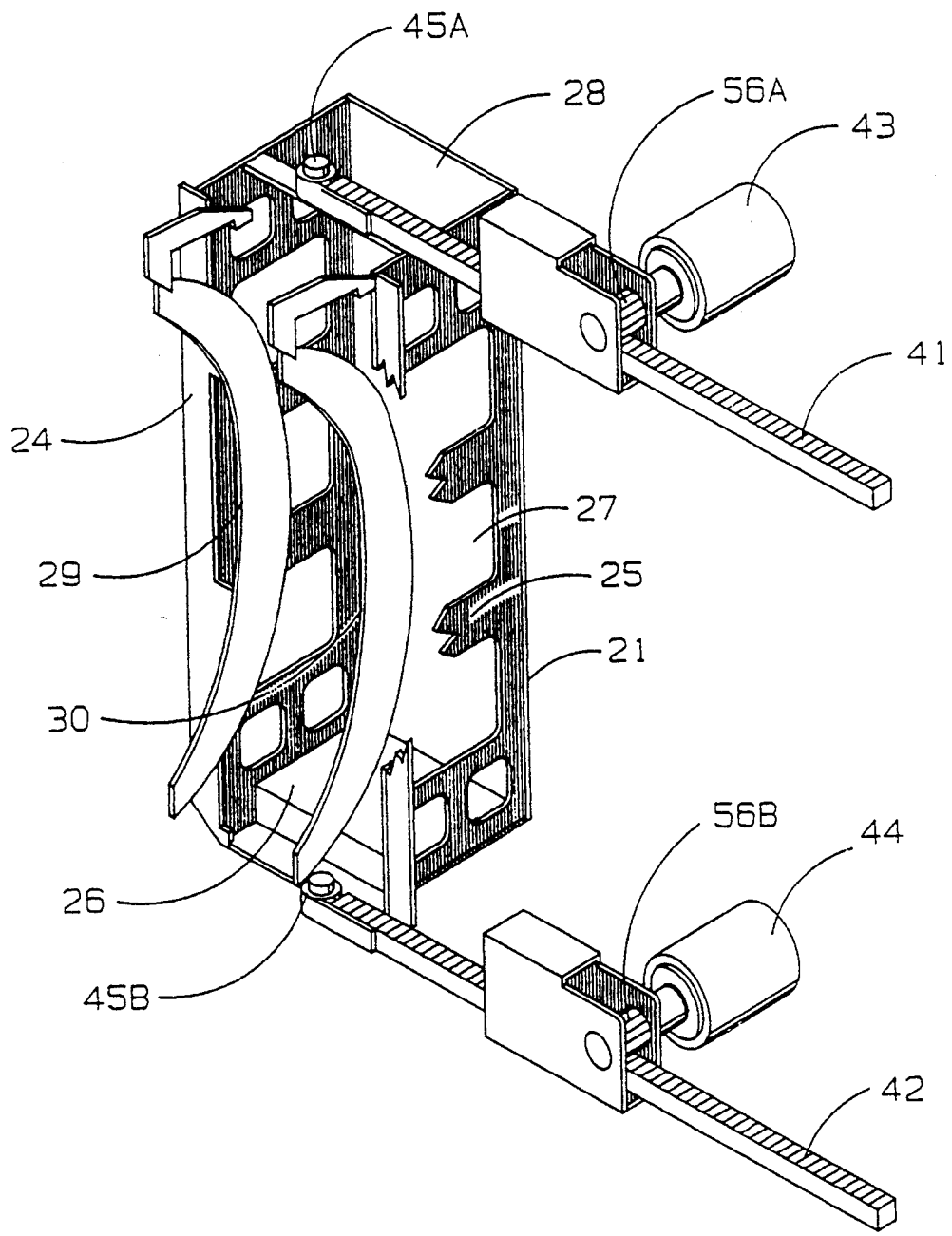
FIG. 7 is a partial perspective view of the preferred embodiment of the apparatus of the present invention showing the fluid jet trolley.

FIGS. 1-10 illustrate generally the preferred embodiment of the apparatus of the present invention designated generally by the number 10. In FIG. 2, there can be seen generally the fluid jet knife apparatus 10 of the present invention that includes a fluid jet knife wrist assembly 11 and a workpiece, or target, positioner frame 12. The wrist assembly 11 and the target positioner frame 12 are spaced apart and positioned so that the fluid jet knife of the fluid jet wrist 11 is directed toward a workpiece (such as a transverse fish section) held in position upon the target positioner frame 12.

The fluid jet knife wrist 11 includes a base 14 that supports an upstanding fluid jet knife frame 15. Fluid let knife frame 15 includes a rear wall 16, a pair of side walls 17, 18 which are generally parallel, and a pair of arcuate tracks for supporting trolley 21 including upper arcuate track 19 and lower arcuate track 20.

Figure 8:
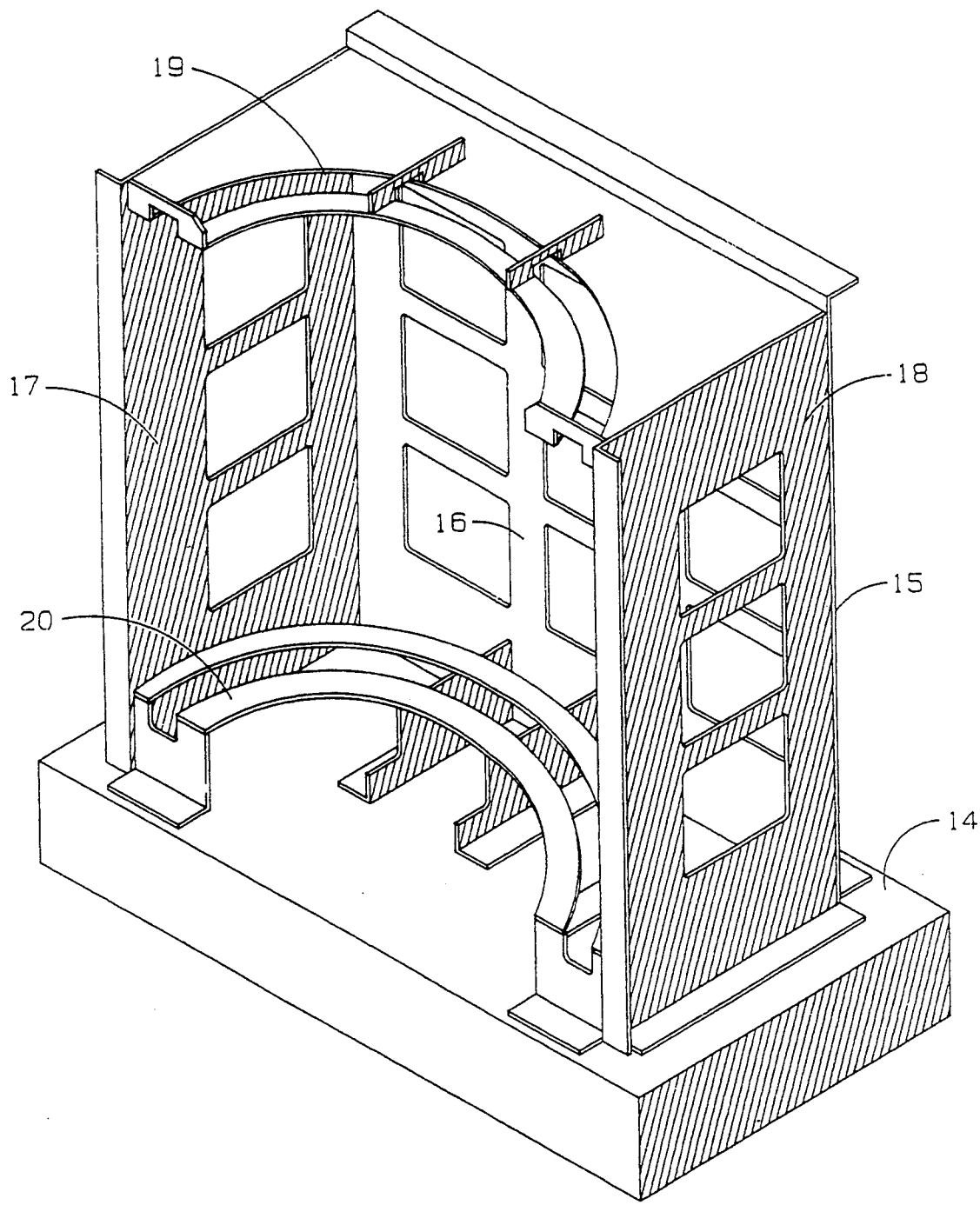
FIG. 8 is a partial perspective view of the preferred embodiment of the apparatus of the present invention showing the fluid jet wrist frame.
Figure 11:
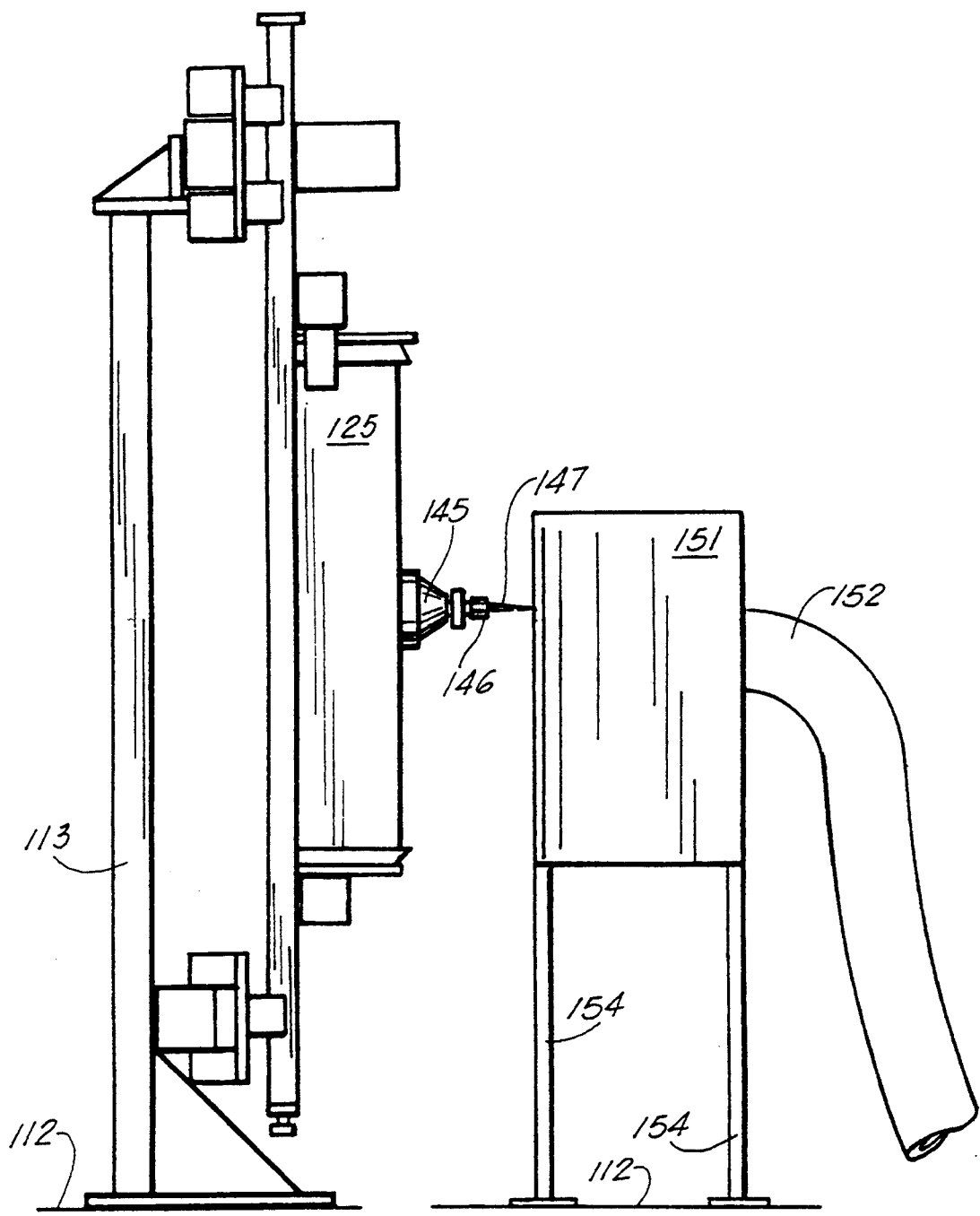
FIG. 11 is a side elevational view of the alternate embodiment of the apparatus of the present invention.
Figure 12:
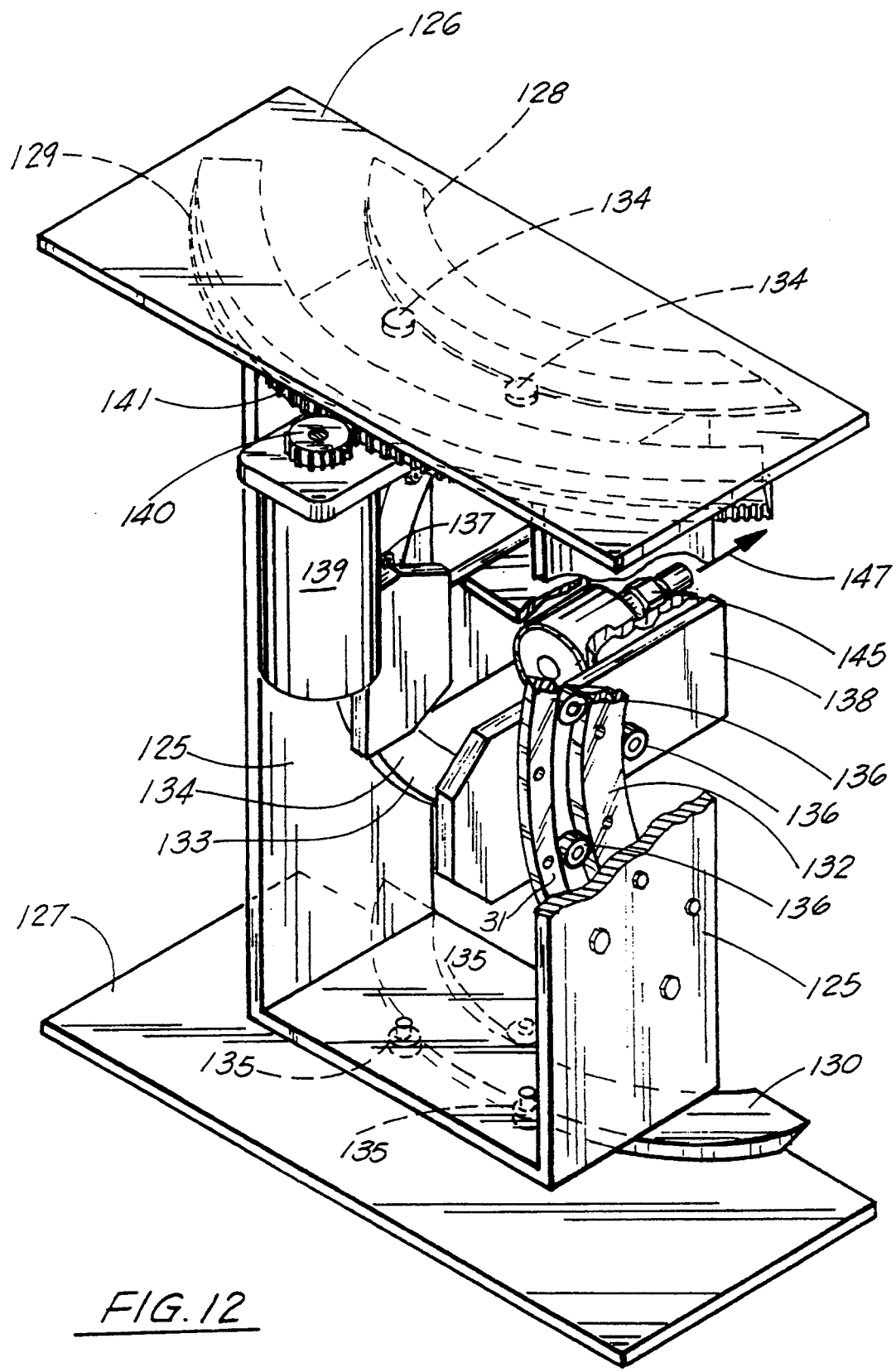
FIG. 12 is a partial perspective view of the alternate embodiment of the present invention.
Figure 13:
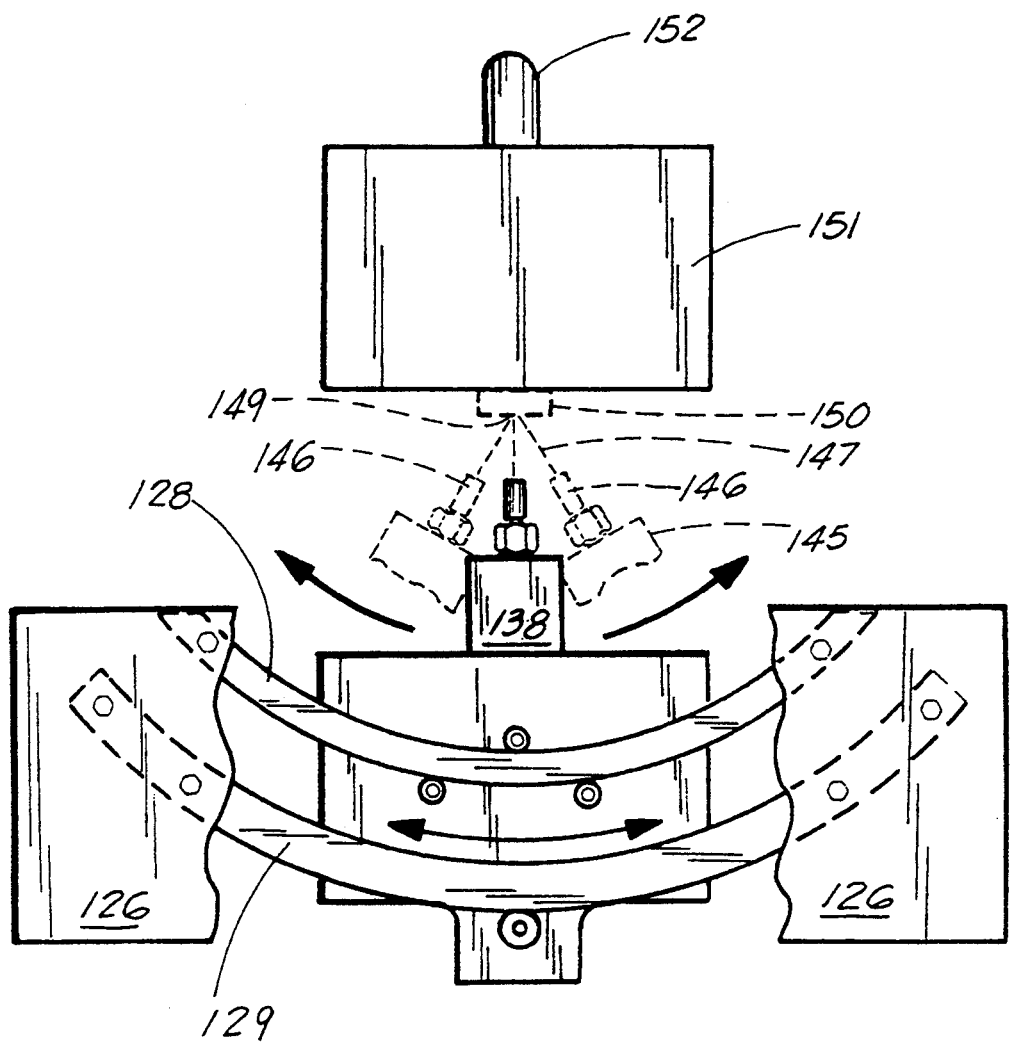
FIG. 13 is a partial top view of the alternate embodiment of the apparatus of the present invention.
Figure 14:
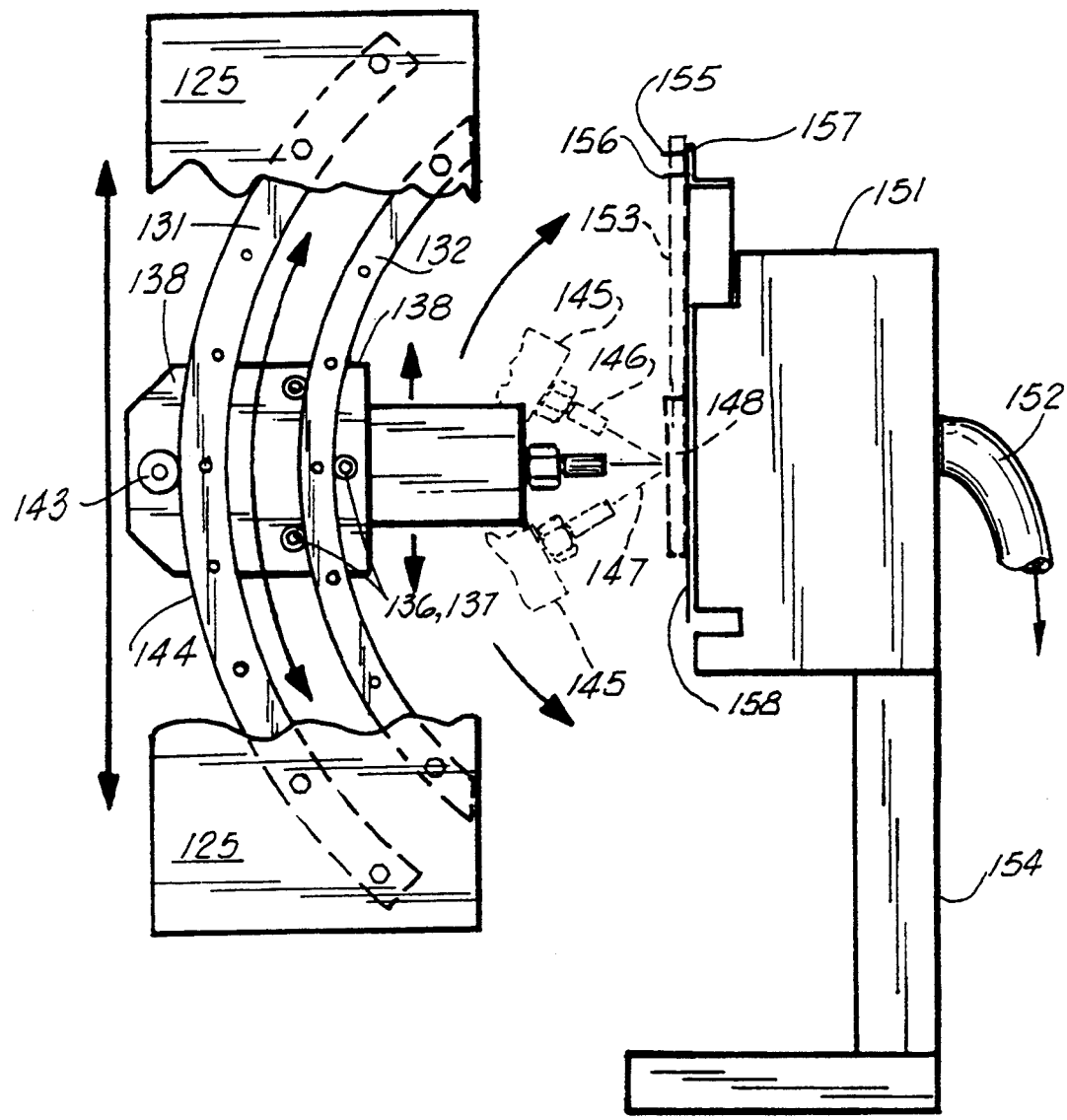
FIG. 14 is a schematic side elevational view of the alternate embodiment of the apparatus of the present invention.

Trolley 21 carries a pair of V-bearing assemblies 22, 23 for rolling engagement of the upper and lower end portions respectively of trolley 21 with frame 15 at its tracks 19, 20. The upper V-bearing assembly 22 of trolley 21 engages track 19 of frame 15. The lower bearing assembly 23 of trolley 21 engages the lower arcuate track 20 of frame 15. Trolley 21 includes spaced apart, generally parallel side walls 24, 25, a bottom 26 and a rear wall 27. The top 28 of trolley 21 is generally parallel to the bottom 26 thereof. A pair of arcuate tracks 29, 30 are mounted upon side walls 24, 25 respectively of trolley 21 as shown in FIG. 8. The arcuate tracks 29, 30 are of similar curvature and support a fluid jet nozzle assembly 36 as it rotates within the trolley 21. The fluid jet nozzle assembly 36 includes a nozzle 38 and a discharge orifice 39. A plurality of wheels 31 carried by the fluid jet nozzle assembly 36 engages the arcuate tracks 29, 30 so that the discharge orifice 39 of the nozzle 38 pivots about a single point P located a selected distance from the discharge orifice 39 along the fluid stream path whenever the fluid jet nozzle assembly 36 rotates about a horizontal axis upon arcuate tracks 29, 30 and about a vertical axis as the trolley 21 rotates along tracks 19, 20. The compound motion about the two axes permits the fluid jet to intersect the pivot point P at any angle lying within a cone of about 90 degrees as defined by the extent of the arcuate tracks 19, 20, 29, 30, thereby providing an infinitely variable cutting angle within the limits of the cone.

The fluid jet nozzle assembly 36 is sized and configured to correspond with the size and shape of arcuate tracks 29, 30 so that the discharge orifice 39 defines a pivot point P when the fluid jet nozzle assembly 36 moves upon the arcuate tracks 29, 30. One or more hoses 37 supply a source of pressurized fluid, such as water, for jetting out through the nozzle 38. The fluid jet nozzle assembly 36 provides an internal channel (not shown) for communicating fluid under pressure from hoses 37 to nozzle 38 and discharge orifice 39. Thus, the fluid jet nozzle assembly 36 provides a high speed fluid stream, or jet, 40 that is used in the processing of a workpiece 50 such as, for example, a transverse fish section.

The fluid jet nozzle assembly 36 is moved upon the tracks 29, 30 and rotated up and down by a rack member 33 that is connected to the fluid jet nozzle assembly 36 at pinned connection 35. Rack 33 can be a toothed rack which engages pinion gear 34 driven by motor drive 32.

A pair of upper and lower generally parallel transverse racks 41, 42 similarly are powered by upper and lower respective motor drives 43, 44 by means of pinions 56A, 56B. Each of the upper and lower transverse racks 41, 42 attaches at pinned connection 45A, 45B to trolley 21. The transverse racks 41, 42 are moved to move trolley 21 upon upper and lower arcuate tracks 19, 20 of frame 15. With the present invention, the motor drives 32 and 43, 44 can operate simultaneously so that the fluid jet nozzle assembly 36 is pivoted about pivot point P upon tracks 19, 20 and upon tracks 29, 30.

Holder 46 is supported at a known position at the front face 47 of target positioner 13 by a gripping device 84. The gripping device has pneumatically activated fingers 85A-C with inner surfaces that engage the holder 46 and retain it in registration with the front face 47. Holder 46 has a pair of spaced apart spikes 46A, 46B, which engage the peripheral edge 53 of workpiece 50 and extend into workpiece 50 between the surfaces 51, 52. Workpiece 50 has a front surface 51 and a rear surface 52. These surfaces 51, 52 are not penetrated by the spikes 46A, 46B so that the same holder can be used during imaging of the surfaces 51, 52 and during fluid jet cutting. Therefore, the holder and spikes do not interfere with imaging of the surfaces 51, 52.

During the processing operation, the rear surface 52 abuts a plurality of parallel knife blades 48 supported in opening 49 of target positioner 13. The front surface 51 faces fluid jet nozzle assembly 36 as shown in FIG. 1. The nozzle 38 protrudes through an opening 82 in splash guard 81, which shields the wrist gears from debris cast off in the cutting process. Nozzle skirt 80, shields the nozzle opening 82.

The workpiece 50 can be a transverse fish section that has been cut with a wedge-shaped cut 54 to remove viscera, for example. The fluid jet knife is thus used to cut around the blood meat, which is inedible and designated generally by the numeral 55 in FIG. 1. Once cut around, the blood meat can be removed in a subsequent operation.

Target positioner 13 includes an enclosure 56 that communicates with exit duct 57 and suction hose 58. Arrow 59 in FIG. 6 illustrates the direction of suction flowing in hose 58 during the processing operation.

Target positioner face 47 can be moved both vertically and horizontally. For vertical movement of target positioner face 47, a pair of vertical rails 60, 61 are provided. Slides 62 affix target positioner face 47 to rail 60, 61. A pair of vertical rack gears 64, 65 are used to move target positioner face 47 up and down upon the vertical rails 60, 61. Motor drives 69, 70 are vertical motor drives for moving the target positioner 13 up and down upon the rail 60, 61. The vertical motor drive 69, 70 can operate a rack and pinion arrangement that includes racks 64, 65 attached at pivot pins 63, 68 and pinions 66, 67.

For horizontal movement of target positioner 13, a plurality of horizontal rails 71, 72 are provided, each rail cooperating with slide bearings 73–76. Motor drive 77 engages rod 78. Rod 78, rotationally supported by bearing assembly 83, cooperates with ball screw assembly 79 to move the target positioner 13 in lateral directions. The bottom of the target positioner frame 12 is attached to the slide bearings 73–76 and the ball screw assembly 79. It should be understood that the operation of the vertical motor drives 69, 70 and the horizontal motor drives 77 can be simultaneous so that the workpiece 50 can be moved up and down as well as laterally at the same time.

The present invention provides a fluid jet knife that can pivot about a single point by moving the fluid jet knife in an arcuate path both horizontally and vertically during processing. Similarly, the workpiece 50 is moved in a vertical direction and simultaneously in a horizontal direction during processing. Further, the fluid jet nozzle assembly 36 and the workpiece 50 can be moved simultaneously during processing. Translating the workpiece 50 and not the nozzle assembly 36 allows much smaller components (motors, structural members, linkages) to be used in the processing of the workpiece 50.

FIGS. 10–14 illustrate an alternate embodiment of the apparatus of the present invention designated generally by the numeral 110. Fluid jet cutting apparatus 110 includes a rigid frame 111 having a lower end that can be placed against an underlying support, such as a reinforced concrete floor 112. A pair of spaced apart columns 113, 114 can be, for example, structural metallic column members.

The frame 111 includes a horizontal upper beam 115 and a horizontal lower beam 116. Vertical beams 117, 118 extend between the beams 115, 116 and are movable by sliding left and right upon bearings 119–122.

Cross bars 123, 124 support a generally rectangular subframe 125 having an upper plate 126 and a lower plate 127.

The sub-frame 125 carries a number of arc-shaped rails upon which a jetting knife carriage 138 is movably affixed. The arc-shaped rails 128–130 are arc-shaped horizontal rails while the arc-shaped rails 131–133 are arc-shaped vertical rails.

The horizontal arc-shaped rails 128–130 support the subframe 125 as it rotates about a generally vertical axis. The plurality of vertical arc-shaped rails 131–133 support jetting knife carriage 138 as it rotates about a generally horizontal axis. A plurality of roller bearings are used to define an interface between the horizontal arc-shaped rails 128–130 and plates 126, 127 while a plurality of side roller bearings 136, 137 define an interface between vertical arc-shaped rails 131–133 and jetting knife carriage 138.

Jetting knife carriage 138 is rotated about a generally horizontal axis and the sub-frame 125 is rotated about a generally vertical axis through the use of separate motor drives. Motor drive 139 has pinion gear 140 which engages curved tooth rack of upper arc-shaped rail 129. Motor drive 142 rotates pinion gear 143 which engages curved tooth rack 144 of vertical arc-shaped rail 131 for rotating jetting knife carriage 138 about a generally horizontal axis.

Jetting knife carriage 138 has a jetting knife 145 which can be powered with a high pressurized stream of fluid. Pivot 149 defines a pivotal position of the jet stream 147 that is emitted from the jet knife 145 at nozzle 146. The pivot 149 defines a pivot for both "X" and "Y" axes because of the positioning of the arc of curvature of each of the rails 128–130 and 131–133. The pivot 149 is shown adjacent a transverse fish slab 150 which is generally oval in cross section, having opposed generally parallel flat surfaces and a curved side or peripheral surface.

The fluid jetting knife 145 produces a high speed fluid jet, or stream, 147 that passes through the fish section 150 and into energy-absorbing collector 151, which can be a container carrying a plurality of ball bearings of steel, for example. Suction 152 removes vapor from the collector 151. Fish section holder 153 supports the fish slab section 150 in a generally vertical orientation against the front surface 158 of collector 151, which describe a generally vertical flat planar surface. The holder has a lower end portion which grips the fish section 150. The collector 151 includes a support stand 154 with an upper most transverse beam 157 having a pair of horizontal small cylindrical reference pins 155, 156 to which the holder 153 is affixed. The reference pins could, for example, place the fish section in a position that is known to the fluid jet knife so that its cuts are precise.

The following Table I lists the parts as used in the specification and in the accompanying drawings including the part number and its description.

TABLE I

| Part Number | Part Description |
|---|---|
| | PARTS LIST |
| 10 | fluid jet knife apparatus |
| 11 | fluid jet knife wrist assembly |
| 12 | target positioner frame |
| 13 | target positioner |
| 14 | fluid jet knife base |
| 15 | fluid jet knife frame |
| 16 | rear wall |
| 17 | side wall |
| 18 | side wall |
| 19 | upper arcuate track |
| 20 | lower arcuate track |
| 21 | trolley |
| 22 | upper V-bearing |
| 23 | lower V-bearing |
| 24 | trolley side wall |
| 25 | trolley side wall |
| 26 | bottom of trolley |
| 27 | rear wall of trolley |
| 28 | top of trolley |
| 29 | arcuate track |
| 30 | arcuate track |
| 31 | wheels |
| 32 | motor drive |
| 33 | rack |
| 34 | pinion gear |
| 35 | pinned connection |
| 36 | fluid jet nozzle assembly |
| 37 | hoses |
| 38 | nozzle |
| 39 | discharge orifice |
| 40 | fluid jet or stream |
| 41 | upper transverse rack |
| 42 | lower transverse rack |
| 43 | upper motor drive |
| 44 | lower motor drive |
| 45 A, B | pinned connection |
| 46 | holder |
| 46 A, B | spikes |
| 47 | front face |
| 48 | knife blades |
| 49 | opening |

TABLE I-continued

PARTS LIST

| Part Number | | Part Description |
|---|---|---|
| 50 | | workpiece |
| 51 | | surface |
| 52 | | surface |
| 53 | | peripheral edge |
| 54 | | wedge shaped cut |
| 55 | | blood meat |
| 56 | A, B | pinion gear |
| 57 | | exit duct |
| 58 | | suction hose |
| 59 | | arrow slide |
| 60 | | vertical rail |
| 61 | | vertical rail |
| 62 | | slide |
| 63 | | pivot pin |
| 64 | | vertical rack |
| 65 | | vertical rack |
| 66 | | pinion |
| 67 | | pinion |
| 68 | | pivot pin |
| 69 | | vertical motor drive |
| 70 | | vertical motor drive |
| 71 | | horizontal rail |
| 72 | | horizontal rail |
| 73 | | bearing |
| 74 | | bearing |
| 75 | | bearing |
| 76 | | bearing |
| 77 | | motor drive |
| 78 | | rod |
| 79 | | ball screw assembly |
| 80 | | nozzle skirt |
| 81 | | splash guard |
| 82 | | splash guard opening |
| 83 | | bearing assembly |
| 84 | | gripping device |
| 85 | A, B, C | gripping device fingers |
| 110 | | fluid jetting cutting apparatus |
| 111 | | frame |
| 112 | | floor |
| 113 | | column |
| 114 | | column |
| 115 | | horizontal beam, upper |
| 116 | | horizontal beam, lower |
| 117 | | vertical beam |
| 118 | | vertical beam |
| 119 | | bearing |
| 120 | | bearing |
| 121 | | bearing |
| 122 | | bearing |
| 123 | | cross bar |
| 124 | | cross bar |
| 125 | | sub-frame |
| 126 | | upper plate |
| 127 | | lower plate |
| 128 | | arc-shaped rail, horizontal |
| 129 | | arc-shaped rail, horizontal |
| 130 | | arc-shaped rail, horizontal |
| 131 | | arc-shaped rail, vertical |
| 132 | | arc-shaped rail, vertical |
| 133 | | arc-shaped rail, vertical |
| 134 | | roller bearings, upper |
| 135 | | roller bearings, lower |
| 136 | | roller bearings, side |
| 137 | | roller bearings, side |
| 138 | | jetting knife carriage |
| 139 | | motor drive |
| 140 | | pinion gear |
| 141 | | curved toothed rack |
| 142 | | motor drive |
| 143 | | pinion gear |
| 144 | | curved toothed rack |
| 145 | | jetting knife |
| 146 | | nozzle tube |
| 147 | | fluid jet stream |
| 148 | | hook end portion |
| 149 | | pivot point |
| 150 | | transverse fish slab section |
| 151 | | collector |
| 152 | | suction |
| 153 | | fish holder |
| 154 | | support stand |
| 155 | | reference pin |
| 156 | | reference pin |
| 157 | | transverse beam |
| 158 | | front surface |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A fish cutting apparatus for processing multiple transversely cut fish section workpieces, each having generally flat opposing surfaces connected with a peripheral curved surface comprising:
    a) a fluid jet frame with a fluid jetting knife movably supported with respect to the frame, and the knife having a nozzle that can emit a high velocity jet of fluid for cutting the fish section workpieces to be processed, the nozzle having a fluid discharge orifice;
    b) means for simultaneously rotating the fluid jetting nozzle about a pair of selected pivots that rotate the knife about a pair of intersecting axes;
    c) a workpiece support frame spaced from the fluid jet frame so that the fluid jet knife is positioned to cut a workpiece supported upon the workpiece frame; and
    d) means for translating a single one of the workpieces in two different directions with respect to the fluid jet frame and during simultaneous jetting of the workpiece by the jet of fluid, so that the workpiece is cut by a coordinated effort of the simultaneous pivotal movement of the knife and translating movement of the workpiece.

2. The apparatus of claim 1 wherein the fluid jet support frame includes a fixed portion and a moving sub-frame portion.

3. The apparatus of claim 1 wherein the support frame includes a fixed portion and a moving sub-frame portion that can be rotated with respect to the fixed portion.

4. The apparatus of claim 2 wherein the support frame includes a first fixed portion having multiple arcuate tracks, and a second portion that is movable upon the arcuate tracks.

5. The apparatus of claim 1 further comprising holder means for supporting the workpiece during cutting and which engages the workpiece at a position in between the flat opposing surfaces.

6. The apparatus of claim 1 wherein the knife can be rotated about a generally vertical axis, and about a generally horizontal axis.

7. The apparatus of claim 1 wherein the knife can be rotated simultaneously about generally horizontal and generally vertical axes.

8. The apparatus of claim 1 further comprising means for simultaneously moving a workpiece into multiple elevational and multiple laterally spaced apart positions with respect to the knife.

9. The apparatus of claim 1 wherein the workpiece can be moved laterally and elevationally with respect to the fluid jet frame.

10. A fish cutting apparatus for processing transversely cut fish sections having generally flat opposing surfaces connected with a peripheral curved surface comprising:
   a) a support frame;
   b) a fluid jetting knife, movable supported about multiple intersecting axes upon the support frame, and having a nozzle with a discharge orifice that can emit a high pressure stream of fluid for cutting the fish sections to be processed;
   c) a workpiece support having a holder for carrying a fish section to be processed;
   d) translating means for raising and lowering the elevational position of the workpiece relative to the support frame and independently of simultaneous movement of the knife; and
   e) means for changing the lateral position of the workpiece relative to the support frame and independently of simultaneous movement of the knife, so that the workpiece is cut by a coordinated effort of the simultaneous pivotal movement of the knife and translating movement of the workpiece.

11. A fish cutting apparatus for processing transversely cut fish sections having generally flat opposing surfaces connected with a peripheral curved surface comprising:
   a) a support frame;
   b) a fluid jetting carriage, movably supported with respect to the support frame and having a fluid jet knife with a nozzle that can emit a high pressure stream of fluid for cutting the fish sections to be processed;
   c) first curved track means on the carriage for pivotally supporting the fluid jet knife for movement about a generally horizontal axis; and
   d) second curved track means for pivotally supporting the carriage for movement about a generally vertical axis;
   e) a workpiece support that is capable of moving the fish section in at least two directions during cutting, the workpiece being simultaneously movable relative to the first and second track means during pivotal movement of the knife, so that the workpiece is cut by a coordinated effort of the simultaneous pivotal movement of the knife and translating movement of the workpiece.

12. The apparatus of claim 11 wherein the first curved track means comprises a pair of curved tracks positioned at laterally spaced positions on the carriage.

13. The apparatus of claim 11 wherein the second curved track comprises upper and lower vertically spaced curved tracks.

14. The apparatus of claim 11 further comprising first motor drive means for moving the fluid jet knife upon the first track means.

15. The apparatus of claim 11 wherein the first and second curved track means includes at least two pairs of curved track portions that are orthogonally positioned with respect to one another.

16. The apparatus of claim 15 wherein one pair of curved track portions is generally horizontally positioned and the other pair of curved track portions is generally vertically positioned.

17. A cutting apparatus for processing transversely cut food section workpieces, each having generally flat opposing surfaces an connected with a peripheral curved surface comprising:
   a) a support frame;
   b) a fluid jetting knife, movably supported with respect to the frame and having a nozzle that can emit a high pressure stream fluid for cutting the food sections to be processed;
   c) track means on the frame for supporting the knife during movement;
   d) workpiece translating means for simultaneously moving the food section workpiece relative to the support frame into at least two different directions including spaced elevational and spaced lateral positions during cutting wherein the fluid jetting knife and workpiece translating means simultaneously move; and
   e) means for pivoting the knife about at least two intersecting axes, and independently of movement of the food section workpiece, so that the workpiece is cut by a coordinated effort of the simultaneous pivotal movement of the knife and translating movement of the workpiece.

18. The apparatus of claim 17 wherein the track means includes at least two curved track portions that are generally orthogonally positioned with respect to one another.

19. The apparatus of claim 18 wherein at least one curved track portion is generally horizontal and at least another curved track portion is generally vertical.

20. The apparatus of claim 17 wherein the track means is positioned on the frame above and below, and on the sides of the knife.

21. The apparatus of claim 17 wherein the track means includes in part, upper and lower, generally horizontally positioned curved tracks.

22. The apparatus of claim 17 further comprising motor drive means for moving the knife upon the curved track means.

23. The apparatus of claim 19 wherein the support frame has a moving sub-frame portion that contains the fluid jetting knife.

* * * * *